(12) United States Patent
Molenaar et al.

(10) Patent No.: US 7,701,118 B2
(45) Date of Patent: Apr. 20, 2010

(54) ULTRASONIC FLOW RATE MEASURING DEVICE

(75) Inventors: Marcel Meijlom Molenaar, Dordrecht (NL); Jan Teunis Aart Pors, Oud-Beijerland (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 151 days.

(21) Appl. No.: 11/684,971

(22) Filed: Mar. 12, 2007

(65) Prior Publication Data
US 2007/0227262 A1     Oct. 4, 2007

(30) Foreign Application Priority Data
Mar. 30, 2006   (DE)   ...................... 10 2006 015 218

(51) Int. Cl.
*H01L 41/04*   (2006.01)
(52) U.S. Cl. ...................................... 310/322; 310/334
(58) Field of Classification Search .................. 310/322, 310/334
See application file for complete search history.

(56) References Cited

U.S. PATENT DOCUMENTS

| | | | |
|---|---|---|---|
| 4,240,002 A * | 12/1980 | Tosi et al. .................... 310/324 |
| 4,373,401 A * | 2/1983 | Baumoel .................. 73/861.18 |
| 4,948,552 A | 8/1990 | Mollot et al. |
| 6,532,827 B1 | 3/2003 | Ohnishi |
| 6,615,674 B2 | 9/2003 | Ohnishi |
| 6,895,825 B1 * | 5/2005 | Barkhoudarian ......... 73/861.28 |
| 7,087,264 B2 * | 8/2006 | Suzuki et al. ................ 427/100 |
| 2003/0020375 A1 * | 1/2003 | Riedel et al. ................. 310/363 |
| 2005/0236932 A1 * | 10/2005 | Nagahara et al. ............ 310/328 |

\* cited by examiner

*Primary Examiner*—Walter Benson
*Assistant Examiner*—Derek J Rosenau
(74) *Attorney, Agent, or Firm*—David S. Safran; Roberts Mlotkowski Safran & Cole, P.C.

(57) ABSTRACT

An ultrasonic flow rate measuring device for measuring the flow rate through a line through which a medium flows has at least one ultrasonic transducer that has a piezo element and a connecting element designed for attaching the ultrasonic transducer to the line with the piezo element attached to the connecting element. An intermediate layer including a plate is disposed between the piezo element and the connecting element that is electrically conductive and attachable to an electromagnetic shield. Thus, an ultrasonic flow rate measuring device that delivers a greater signal-to-noise ratio is achieved.

9 Claims, 3 Drawing Sheets

ULTRASONIC FLOW RATE MEASURING DEVICE

BACKGROUND OF THE INVENTION

1. Field of the Invention

The invention relates to an ultrasonic flow rate measuring device, especially a clamp-on ultrasonic flow rate measuring device, for measuring the flow rate through a line through which a medium flows. In particular, the invention relates to an ultrasonic transducer having a piezo element and a connecting element acting as a wave guide or ultrasonic propagating element designed for attaching the ultrasonic transducer to the line with the piezo element attached to the connecting element.

2. Description of Related Art

Clamp-on ultrasonic flow rate measuring devices are characterized in that they can be used especially easily. In contrast to other ultrasonic flow rate measuring devices that must be permanently integrated into the existing pipeline system by replacing a piece of the pipeline, clamp-on flow rate measuring devices can simply be placed from the outside on a suitable line section of the piping system. The line section to which the clamp-on ultrasonic flow rate measuring device is attached thus essentially becomes a measuring line without the need for its own separate measuring line that would have to be inserted into the piping system with great effort. This makes the use of clamp-on ultrasonic flow rate measuring devices simple and economical.

However, the problem with clamp-on ultrasonic flow rate measuring devices, as with other ultrasonic flow rate measuring devices, is often that the attainable signals are only very small. This can be attributed, for example, to low operating voltages due to the circuits that are inherently designed to be safe. Moreover, the signal-to-noise ratio is also degraded by unmatched acoustic transitions between different materials. Finally, on the signal path, signal losses due to attenuation effects occur in the respective medium. This is often associated with a very small measurement signal output by the receiving ultrasonic transducer. Such a small measurement signal is especially susceptible to electromagnetic noise.

Thus, there is a need for an ultrasonic flow rate measuring device that is easy to use yet delivers a strong signal.

SUMMARY OF THE INVENTION

An object of the invention is to provide an ultrasonic flow rate measuring device, especially a clamp-on ultrasonic flow rate measuring device that delivers a good, or high, signal-to-noise ratio.

Another aspect of the invention is to provide an ultrasonic flow rate measuring device that has an intermediate plate disposed between the piezo element and a connecting element, which functions as an ultrasonic propagating element. The intermediate plate can be provided with different geometries. According to a preferred embodiment of the invention, the top and bottom of the intermediate plate run parallel to one another. In this way, the ultrasonic signals running through the intermediate plate are subjected to the least possible influences by the geometry of the intermediate plate.

The piezo element can be electrically connected in different ways. According to a preferred embodiment of the invention, the intermediate plate is used as an electrical connection for the piezo element. For this purpose, the intermediate plate is provided with a metallic portion that can be in direct physical, metallically conductive contact with the piezo element. In particular, in this construction the piezo element rests flat on the intermediate plate or parts of the intermediate plate.

Furthermore, according to a preferred embodiment of the invention, the piezo element is attached to the connecting element by means of the intermediate plate. In this arrangement, the intermediate plate has at least one recess in which there is a layer of adhesive for attachment of the piezo element to the connecting element. By this, the piezo element is cemented onto the connecting element, specifically by means of the layer of adhesive provided in the recess of the intermediate plate. Further, the thickness of the layer of adhesive can correspond to the thickness of the intermediate plate.

Finally, according to a preferred embodiment of the invention, the ultrasonic transducer is intended for operation with a predetermined ultrasonic frequency, and the thickness of the intermediate plate corresponds to one fourth of the ultrasonic wavelength in the layer of adhesive at the predetermined ultrasonic frequency. In this way, optimum adaptation that ensures the lowest losses is likewise achieved. The layer of adhesive can be an electrically conductive cement so that electrical contact-making of the piezo element need not necessarily take place via the intermediate plate.

According to another preferred embodiment, the ultrasonic transducer is located within an electromagnetic shielding means. In this case, measures are taken to ensure that the ultrasonic transducer is not exposed to electromagnetic noise. If electromagnetic noise cannot be coupled into the lines and components, such as electronic components, of the ultrasonic transducer, it is possible by means of a shielded line, for example, to decouple the signal that has been output by the receiving ultrasonic transducer at least essentially free of external interference.

Basically within the framework of the invention different shielding means are possible. The shielding means can be formed by a metallic or at least a metallically coated housing. Further, for electrical connection of the ultrasonic transducer, a cable can be provided with shielding, wherein the cable shielding is metallically and conductively connected to the shielding means. Thus, the above described advantages can be achieved such that the measurement signal, which has been output by the ultrasonic transducer, can be output more or less free of external interference.

The intermediate plate can be a component of the electromagnetic shielding means for the ultrasonic transducer. In this case, but also in accordance with other variations of the invention, the intermediate plate is preferably completely metallic at least on the side facing the piezo element. This metallic construction of the intermediate plate is also necessary for the above described function of the intermediate plate as an electrical connection for the piezo element.

The electrical connection of the piezo element on its side opposite the intermediate plate can be made in different ways. The side of the piezo element opposite to the intermediate plate can function as the electrical connection with a terminal spring adjoining the piezo element. Thus, especially simple and reliable electrical contact-making of the piezo element is achieved.

Basically, the piezo element can be attached freely on the connecting element. According to one preferred embodiment of the invention, the connecting element has positioning means for the piezo element. In particular, the connecting element is designed as a positioning means with walls or pins that project from the connecting element, within which an exactly defined positioning site for the piezo element is determined.

Finally, the connecting element can be made from various materials and can follow different geometries. According to one preferred embodiment of the invention, the connecting element is a wedge made preferably of plastic.

Details of the invention are described below with reference to the drawings.

BRIEF DESCRIPTION OF THE DRAWINGS

Like reference numerals in the drawings represent like elements.

DETAILED DESCRIPTION OF THE INVENTION

Figure 1:
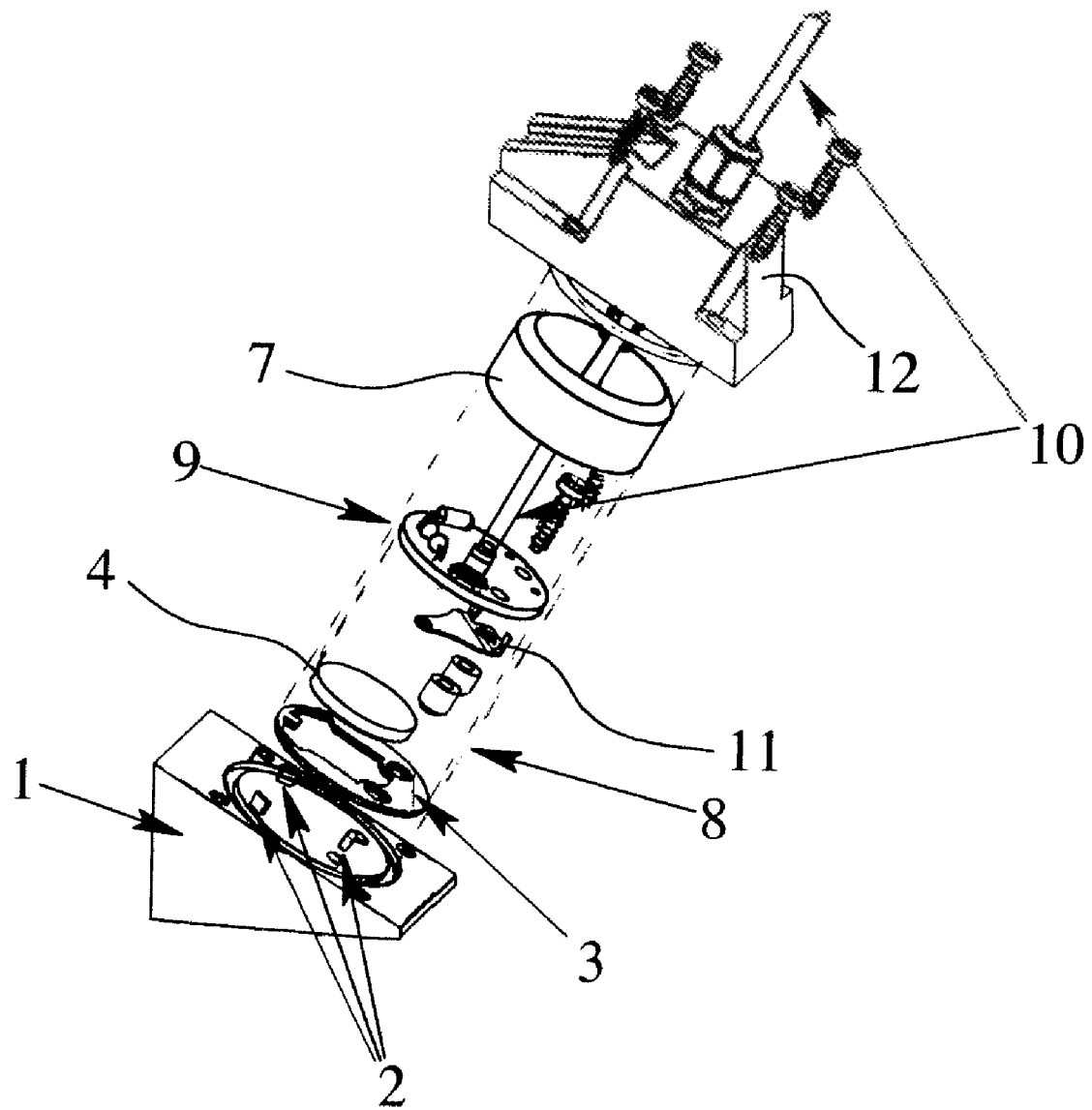
FIG. 1 is an exploded side view of the ultrasonic transducer of an ultrasonic flow rate measuring device according to an embodiment of the invention.

The components of the ultrasonic transducer unit in accordance with this invention are shown in the exploded view in FIG. 1. The ultrasonic transducer unit has a connecting element 1 in the form of a plastic wedge through which the actual connection occurs between the ultrasonic transducer unit and the line (not shown) through which the medium flows with a flow rate that is to be measured. The connecting element 1 acts as a wave guide or ultrasonic propagating element. The connecting element 1 has positioning means 2 in the form of projecting wall sections, which are used as a positioning aid for an intermediate plate 3 and a piezo element 4. The intermediate plate 3 is disposed between the connecting element 1 and the piezo element 4 and forms a conductive layer by being formed at least partially of metal and/or including a conductive insert as explained below. The intermediate plate 3 can be formed of various geometries. In this example, the plate 2 has a top and bottom that are parallel to each other, which poses the least influence on the ultrasonic signals that will pass through the plate.

Figure 2:
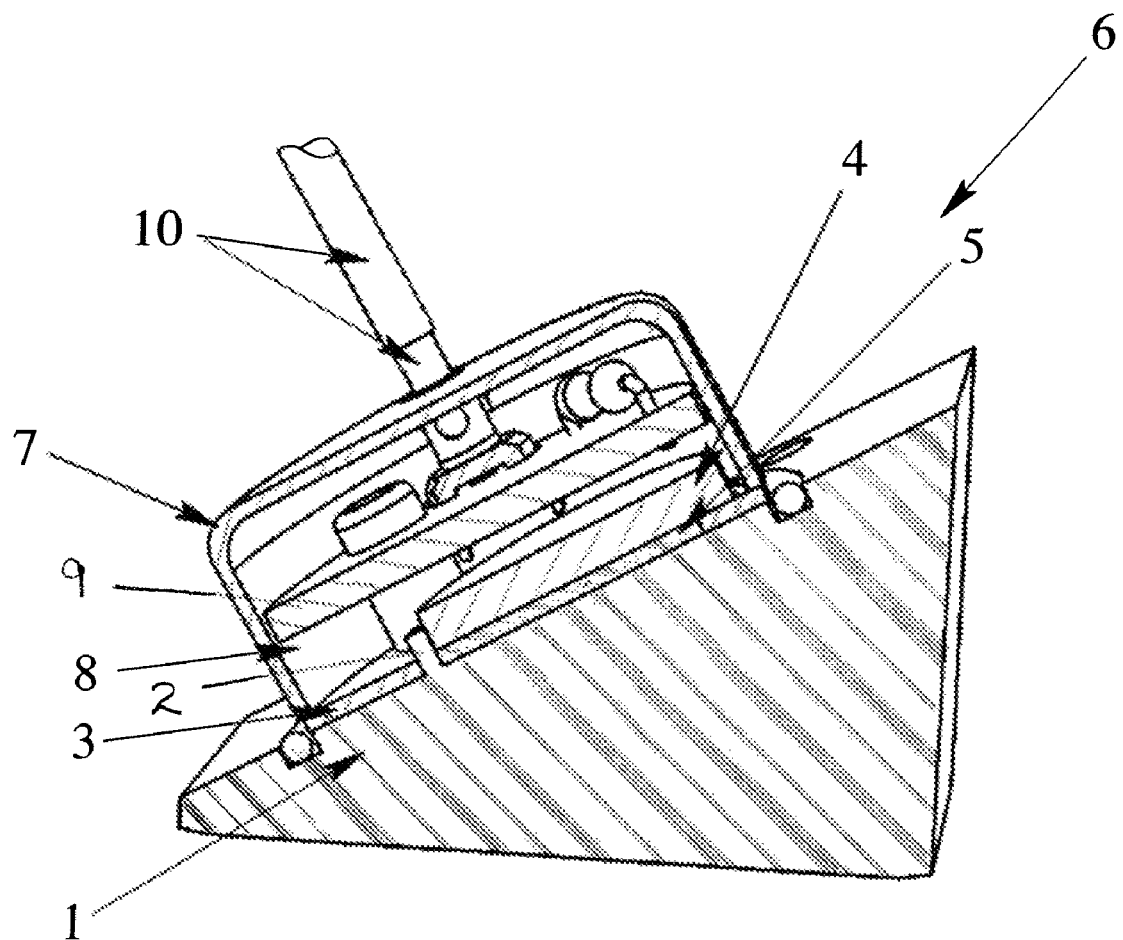
FIG. 2 is a side view in section of the ultrasonic transducer of FIG. 1.
Figure 3:
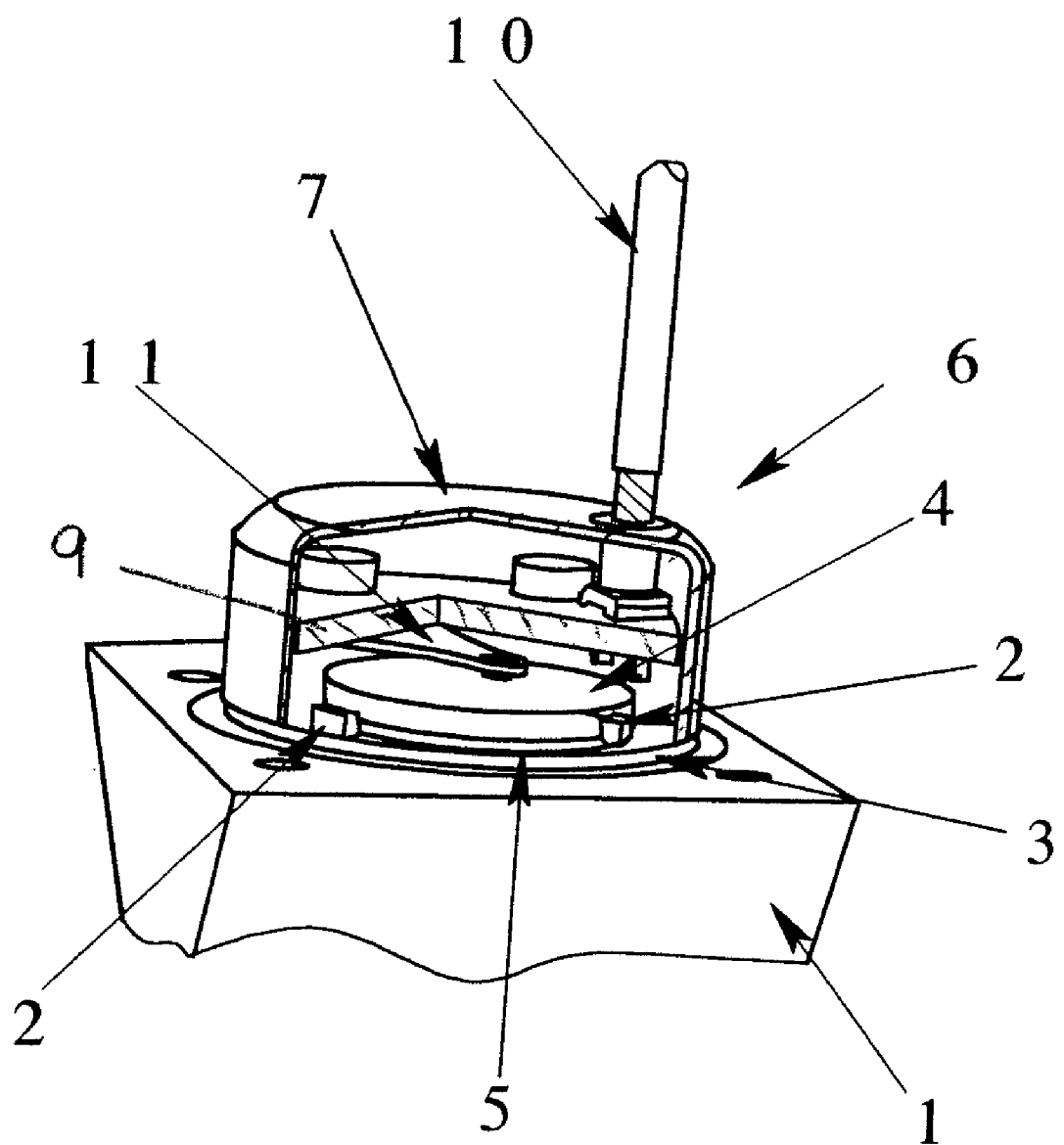
FIG. 3 is another side perspective view in partial section of the ultrasonic transducer of FIG. 1.

The intermediate plate 3 has an inner opening, seen in FIG. 1, so that when the intermediate plate 3 rests on the connecting element 1 there is a space, which can be filled with an insert, such as a layer 5 of adhesive, as is apparent from FIGS. 2 and 3. The layer 5 of adhesive can be, for example, a single-component or bi-component electrically conductive epoxy cement. As is apparent from the figures, the intermediate plate 3 is made such that the piezo element 4 rests on the layer 5 of adhesive and also on parts of the intermediate plate 3. Thus, at least a portion of the layer formed by the intermediate plate 3 is formed of conductive material, either by the plate 3 being made of metal or having a metallic surface and/or the adhesive 5 being made of conductive material. This forms a direct electrically conductive contact with the piezo element 4.

In the preferred embodiment of the invention described here, an electromagnetic shielding mechanism 6 is provided for shielding electromagnetic noise that is composed of the intermediate plate 3 and a housing 7, made of at least partly of metal. The housing 7 rests on the intermediate plate 3 and covers the ultrasonic transducer 8 formed of the piezo element 4 along with other electronic elements 9 so that a closed, shielded space is defined over the ultrasonic transducer 8.

The electrical connection of the ultrasonic transducer unit takes place via a coaxial cable 10 with shielding connected to the electromagnetic shielding means 6, specifically the housing 7. The core of the cable 10 is routed to a terminal spring 11, which is provided on the side of the piezo element 4 opposite the intermediate plate 3. Because the piezo element 4 rests on the intermediate plate 3 in a galvanically conductive manner and the shielding of the coaxial cable 10 is connected to the housing 7, which also lies on the intermediate plate 3, grounding of the piezo element 4 on the side opposite to the terminal spring 11 takes place.

All components are finally protected by a plastic housing 12, seen in FIG. 1, which is screwed onto the connecting element 1. The result is that the ultrasonic transducer 8 can output a measurement signal that is more or less free of external interference.

It is also important that the thickness of the layer 5 of adhesive corresponds to the thickness of the intermediate plate 3, as can be appreciated from FIG. 2. In this connection, the ultrasonic transducer 8 is designed for operation with a predetermined ultrasonic frequency so that the thickness of the intermediate plate 3 can be selected such that it corresponds to one fourth of the ultrasonic wavelength in the layer 5 of adhesive at a predetermined ultrasonic frequency. Thus, the advantage of optimum adaptation of the transition of the ultrasonic signals from the piezo element 4 to the connecting element 11 is achieved.

Variations and modifications to the device and particular components can be made to the invention and remain within the scope of the invention set forth in the appended claims. For example, the shape and materials of the components can be changed depending on the particular intended use.

What is claimed is:

1. Ultrasonic flow rate measuring device for measuring a flow rate through a line through which a medium flows, comprising:

at least one ultrasonic transducer including a piezo element and a connecting element designed for attaching the ultrasonic transducer to the line to be measured, wherein the piezo element is attached to the connecting element with an intermediate layer, including a plate, disposed between the piezo element and the connecting element, wherein the intermediate layer is electrically conductive and contacts the piezo element, wherein the intermediate plate has at least one recess formed therein, and wherein a layer of adhesive is provided in the recess, the adhesive attaching the piezo element to the connecting element, further comprising electronic elements that form an ultrasonic transducer in conjunction with the piezo element that is operable with a predetermined ultrasonic frequency, wherein the thickness of the intermediate plate equals one fourth of the ultrasonic wavelength in the layer of adhesive at the predetermined ultrasonic frequency.

2. Ultrasonic flow rate measuring device as claimed in claim 1, wherein the intermediate plate has a top and a bottom that are parallel to each other.

3. Ultrasonic flow rate measuring device as claimed in claim 1, wherein the intermediate plate is used as an electrical connection for the piezo element.

4. Ultrasonic flow rate measuring device as claimed in claim 1, wherein the piezo element is attached to the connecting element by the intermediate plate.

5. Ultrasonic flow rate measuring device as claimed in claim 1, wherein the adhesive includes an electrically conductive material.

6. Ultrasonic flow rate measuring device as claimed in claim 1, wherein a thickness of the layer of adhesive equals a thickness of the intermediate plate.

7. An ultrasonic flow rate measuring device for measuring flow of a medium through a line, comprising:

a connecting element configured to attach to an outer surface of the line and form an ultrasonic propagating element;

a plate including a metallic portion disposed on the connecting element;

an ultrasonic transducer including a piezo element connected to the plate so that the piezo element is mounted on the connecting element;

an electromagnetic shield including a conductive housing disposed around the ultrasonic transducer connected to the plate and to the ultrasonic transducer; and, an electrical cable connected to the electromagnetic shield to actuate the ultrasonic transducer at a predetermined ultrasonic frequency to generate output signals, wherein the intermediate plate has at least one recess formed therein, and wherein a layer of adhesive is provided in the recess, the adhesive attaching the piezo element to the connecting element, wherein the thickness of the intermediate plate equals one fourth of the ultrasonic wavelength in the layer of adhesive at the predetermined ultrasonic frequency.

8. Ultrasonic flow rate measuring device as claimed in claim 7, wherein the connecting element is a plastic wedge.

9. Ultrasonic flow rate measuring device as claimed in claim 8, wherein the connecting element has positioning members that abut the piezo element.

* * * * *